United States Patent [19]
Slovak et al.

[11] Patent Number: 5,354,464
[45] Date of Patent: Oct. 11, 1994

[54] MULTI-PORT CONNECTING DEVICE

[75] Inventors: Jack P. Slovak, Incline Village, Nev.; Laurence W. Bassett, Westminster, Calif.; Robert A. Slovak, Incline Village, Nev.; David R. Spears, Laguna Niguel, Calif.

[73] Assignee: Water Factory Systems, Irvine, Calif.

[21] Appl. No.: 494,142

[22] Filed: Mar. 14, 1990

[51] Int. Cl.$^5$ .............................................. B01D 27/08
[52] U.S. Cl. .................................... 210/240; 210/288; 210/440
[58] Field of Search ........................ 210/288, 440, 240

[56] References Cited
U.S. PATENT DOCUMENTS

| | | | |
|---|---|---|---|
| 3,266,628 | 8/1966 | Price | 210/440 |
| 3,950,251 | 4/1976 | Hiller | 210/288 |
| 4,515,692 | 5/1985 | Chandler et al. | 210/288 |
| 4,877,521 | 10/1989 | Petrucci et al. | 210/288 |
| 4,915,831 | 4/1990 | Taylor | 210/440 |

Primary Examiner—Tim Miles
Attorney, Agent, or Firm—Leonard Tachner

[57] ABSTRACT

An improved multi-port connection device (10) adapted to receive prior art membrane and filter canisters (12) and to make connections between plural connection devices more convenient and versatile, comprising a plurality of flow ports (43,45,47) which are all at a common level, two of which communicate through apertures (52,54) in a barrier wall (55) forming a female connector with input and output flow paths (18,16) in the canister male connector, said apertures (52,54) being positioned in the barrier wall (55) on separate sides of an O-ring seal at locations communicating with the input and output flow paths (18,16).

15 Claims, 7 Drawing Sheets

MULTI-PORT CONNECTING DEVICE

BACKGROUND OF THE INVENTION

1. Field of the Invention

The present invention relates generally to devices for interconnection to canisters such as reverse osmosis membrane canisters or filters used in water purification systems and more specifically to a universal multi-port connecting device in which the ports thereof can be designated for input or output, depending upon the position of a hole drilled in a port barrier for directing the flow of a fluid therethrough.

2. Prior Art

It will be seen hereinafter, that the present invention comprises an improvement to relatively specific prior art comprising a dual-port interconnecting device, the purpose of which is to provide input and output connection capability to a certain type of canister, generally of elongated cylindrical configuration. More specifically the canister with which the noted prior art, as well as the improvement of the present invention are designed to be used, provides a unitary multiple-flow-path port, which simultaneously provides an input fluid-flow path, as well as an output fluid flow path to convey fluid both in and out of the canister. Typically, such canisters comprise housings for a reverse osmosis membrane and/or filtering media such as carbon or the like, which is known to remove certain solid particulates or gases from a fluid such as water. Such filters are typically used in water purification systems such as reverse osmosis water purification systems in which the reverse osmosis membrane thereof works best when the water to be purified is first filtered to remove large particulate material which might otherwise more rapidly tend to clog and otherwise reduce the operating life of the membrane. In addition, reverse osmosis systems typically employ post filters, that is, filters which receive the water that has passed through the reverse osmosis membrane and may still be improved, as far as taste and impurities are concerned, by passage through an additional filter. Often, depending upon the nature of the impurities in the water, one or more additional filters positioned before the reverse osmosis membrane of the system, may be used to further improve the quality of the water through the system by removing certain ingredients such as particulates, chlorine, and the like, which may otherwise constitute a health threat or have an adverse effect on the life of the membrane.

In the past, such filtering canisters have been provided with two separate and distinctly located ports, one comprising an input and one an output for interconnection into the reverse osmosis water purification system. However, recently there has been an improved canister configuration advantageously used for filters in water purification systems. Such canisters provide a single or unitary port having multiple flow channels therein to enable interconnection of such canisters into a system for input and output, while using only one interconnecting device. Such improved canisters can substantially reduce the labor and hardware requirement for fabrication and assembly of such reverse osmosis water purification systems. In addition, use of such canisters of a generally standard shape and dimension, tends to improve the functional and aesthetic configuration of the system into which such canisters are installed.

Unfortunately, as will be seen hereinafter, while such canisters provide a significant improvement in the art of reverse osmosis water purification systems, the connecting device designed to interface with such canisters and specifically with the multiple-flow-path, unitary port thereof, has been configured somewhat disadvantageously. More specifically, in such prior art connecting devices for the aforementioned improved filter canisters, only two ports are provided, one for input and one for output and such ports are at two different levels, thereby making it less convenient to interconnect such devices for fluid flow between such membrane or filter canisters. Furthermore, one port of the prior art connecting device is configured so that it can only interface with one of the canister flow paths and the other port of the prior art connecting device is configured so that it can only interface with the other such flow path of the canister device. Furthermore, the respective port configurations of the prior art interconnecting device are relatively large and bulky, rendering them difficult to interface mechanically with other structure within a reverse osmosis water purification system.

Thus while the prior art canister configuration provides a significant improvement in the art of fluid filtering and in the art of reverse osmosis water purification systems, the connecting device designed to interface with such improved canisters, while functionally adequate for performing its task of providing interconnecting ports thereto, suffers from a number of significant disadvantages. These disadvantages significantly detract from the efficacy and functionality of the prior art improvement derived from such unitary multiple-flow-path port canisters. There is therefore accordingly, a need for a connecting member, adapted for interfacing with the aforementioned prior art canisters as well as with other canister designs and which overcomes the deficiencies noted above. More specifically, there is a need for connection devices which provide more than just two ports. Furthermore, there is a need to provide a connection device in which all ports are at the same level to facilitate interconnection in a system. There is furthermore a need to provide a connection device for such canisters wherein each of a number of ports can be relatively easily allocated for interconnection to any of the multiple fluid paths in the canister port without any substantial mechanical modification that would otherwise detract from the efficiency and advantages of the aforementioned prior art canister. There is furthermore a need to provide a connection device for the aforementioned canisters wherein the physical configuration thereof is more conducive to interconnection within a system, such as a reverse osmosis water purification system, for increasing the convenience of both mechanical and fluid flow interconnections thereto.

SUMMARY OF THE INVENTION

The present invention comprises an improved multi-port connection device for attachment to membrane and filter canisters of the type described above. Unlike the previously noted prior art connection device for such canisters, the connection device of the present invention comprises more than two ports, all mechanically figured to be at the same level and each designed to provide a fluid path with any of the fluid paths available at the unitary multiple-fluid-path port of the canister described. The selection of the fluid path for a particular port is determined by the relative position of an aperture which may be drilled or otherwise provided in the wall or barrier of the port. If the aperture is positioned at a point in the barrier which is farthest from the filter canister, the port interfaces with one flow path thereof. If the aperture is positioned closest to the filter canister, the flow path established is with another flow path of the filter canister port. If no aperture is drilled in the selected port of the connection device of the present invention, then there is no fluid path through that particular port.

Two embodiments of the invention are shown herein. One such embodiment provides three such ports in a co-planar configuration at 90 degree intervals, so that two of such ports are perpendicular to one another, and two are coaxially aligned. In a second configuration, the aforementioned three ports, which are co-planar, may interface with an additional port which is perpendicular to the plane of the other three ports. This so-called Z-port may be used either for flow interface with a flow path of the canister port, or can be provided with a sensor probe for example, for monitoring the temperature or mineral content of the fluid exiting the filter canister. The Z-port connect sensor may be in communication with a shutoff valve in order to selectively interrupt the fluid flow into or out of the canister or system to which the present invention is connected.

Unlike the previously described prior art, which will be more fully explained hereinafter in conjunction with FIGS. 1 through 4 of the appended drawings, herein, the co-planar ports of the present invention are all at a common level, which makes interface between membrane or filter canister connection devices of the present invention far more convenient-than it would be using the prior art connection device. Such interconnections between devices of the present invention may be carried out by using one or both of two interconnecting members. One such member, referred to hereinafter as the short interconnect member, provides a common wall for closely spacing two such connection devices of the present invention. The other such member, referred to hereinafter as the long interconnect member, provides two such walls for larger spacing between the connection devices of the present invention. Furthermore, it will be seen hereinafter that at least one preferred embodiment of the present invention provides mechanical attachment means above the plane of the co-planar ports which, unlike the prior art device to be described hereinafter, permits the connection of the present invention to a mechanical planar surface. This feature permits convenient connection of the present invention and its attendant membrane or filter canister, to a bracket or the like for more convenient mechanical configuration. One such configuration is illustrated in co-pending application Ser. No. 07/418,093 filed Oct. 6, 1989, now U.S. Pat. No. 5,143,601 and assigned to the assignee hereof, wherein four such canisters, using the connection device of the present invention, are affixed to a common planar bracket member within a countertop reverse osmosis water purification system, the advantageous size and shape of which is more readily and conveniently realized because of the significant mechanical advantages derived from the present invention.

OBJECTS OF THE INVENTION

It is therefore a principal object of the present invention to provide an improved multi-ported connection device for use with a prior art canister housing of the type commonly used as a membrane or filter canister having a unitary multiple-flow-path port and wherein the present invention provides at least three co-planar ports therefor, any of which can be connected to any one of the flow paths of the canister.

It is an additional object of the present invention to provide an improved multi-port connection device for a membrane or filter canister of the type having a unitary multiple flow-path port structure at one end of an elongated cylindrical canister, the present invention providing a plurality of ports which may be configured for interface with any fluid path of the canister port in accordance with the position of an aperture drilled into or otherwise created in a wall or barrier thereof.

It is still an additional object of the present invention to provide an improved multi-port connection device for attachment to a canister having a unitary multiple-flow-path port structure, wherein there are at least three such ports in the connection device, two of which are coaxially configured and two of which are perpendicularly configured, whereby both straight-through and angular relationships can be established between the input and output to such canisters.

It is still an additional object of the present invention to provide an improved multi-port connection device for a canister of the type having a unitary multiple-flow-path port structure, wherein the connection device is mechanically configured to permit interconnection thereof to a planar bracket, as well as to permit the provision of an additional port structure, perpendicular to the plane of the other port thereof, which port structure may be used for insertion of a probe or the like.

BRIEF DESCRIPTION OF THE DRAWINGS

The aforementioned objects and advantages of the present invention, as well as additional objects and advantages thereof, will be more fully understood hereinafter as a result of a detailed description of preferred embodiments when taken in conjunction with the following drawings in which.

DETAILED DESCRIPTION OF A PREFERRED EMBODIMENTS

Reference will be first made to FIGS. 1 through 4 for a description of one canister with which the present invention is designed to connect, as well as a description of the prior art connection device over which the present invention constitutes an improvement. Referring to FIGS. 1 through 4, it will be seen that the prior art dual-port connection device 10 is designed to mate with a canister 12 of the type having a unitary multiple-fluid-path port 14. Port 14 provides a first fluid path 16 and a second fluid path 18 and comprises a first "O"-ring 20 and second "O"-ring 22. First "O"-ring 20 is designed to isolate the first fluid path 16 from the second fluid path 18 and second "O"-Ring 22 is designed to isolate second fluid path 18 from the remaining portion of the canister 12. In addition, canister 12 provides a pair of flanges 24, which are designed to cooperate with certain locking members 36 of connection device 10, as will be seen hereinafter, to affix the connection device to the canister.

Figures 1, 2, 3:
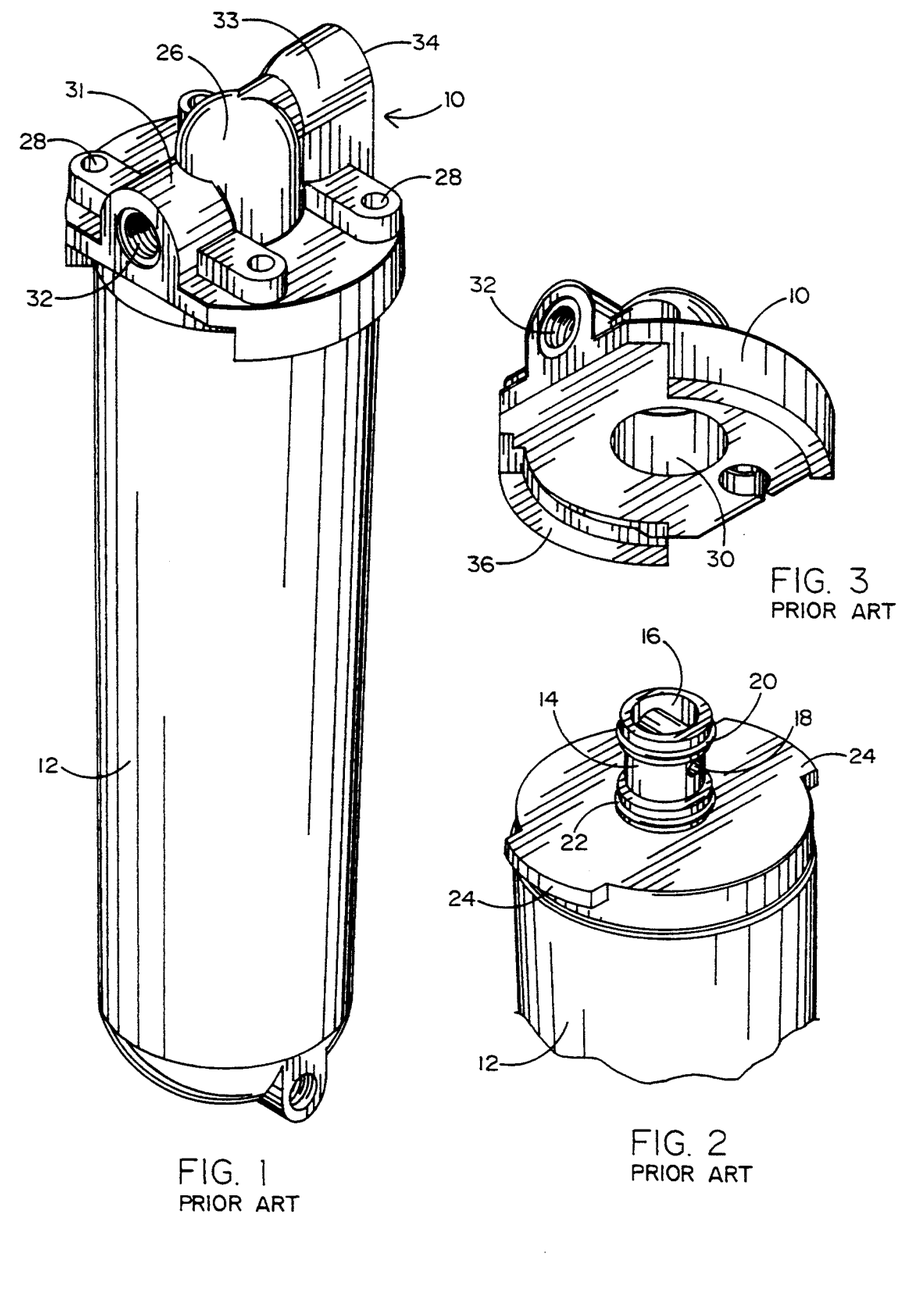
FIG. 1 is an isometric view of the prior art canister housing with which the present invention is designed for use but shown with a prior art connection device attached thereto.
FIG. 2 is an enlarged view of the port configuration of the prior art canister with which the present invention is designed for use.
FIG. 3 is an isometric view of the prior art connection device which the present invention is designed to replace.

The connection device 10 is provided with a port connection dome structure 26, the interior 30 of which is designed to overlie and firmly engage the unitary multiple-fluid path port 14 with the interior radial wall of dome interior 30, making firm, waterproof contact with "O"-rings 20 and 22. Connection device 10 also provides a first port 31, having a first port passage 32 therethrough and a second port 33 having a second port passage 34 therethrough. Passages 32 and 34 extend through to the dome interior 30 at two distinct levels, whereby passage 32 is in fluid communication with second fluid path 18 of the port 14 and passage 34 is in fluid communication with first fluid path 16 of port 14. Connection device 10 also provides a plurality of threaded recesses 28, which as seen best in FIG. 1, are positioned at a level below port connection dome 26, as well as below first port 31 and second port 33. As previously indicated, a pair of locking members 36 are designed to rotatably engage flanges 24 of the canister 12 to secure the connection device 10 thereto.

Figure 4:
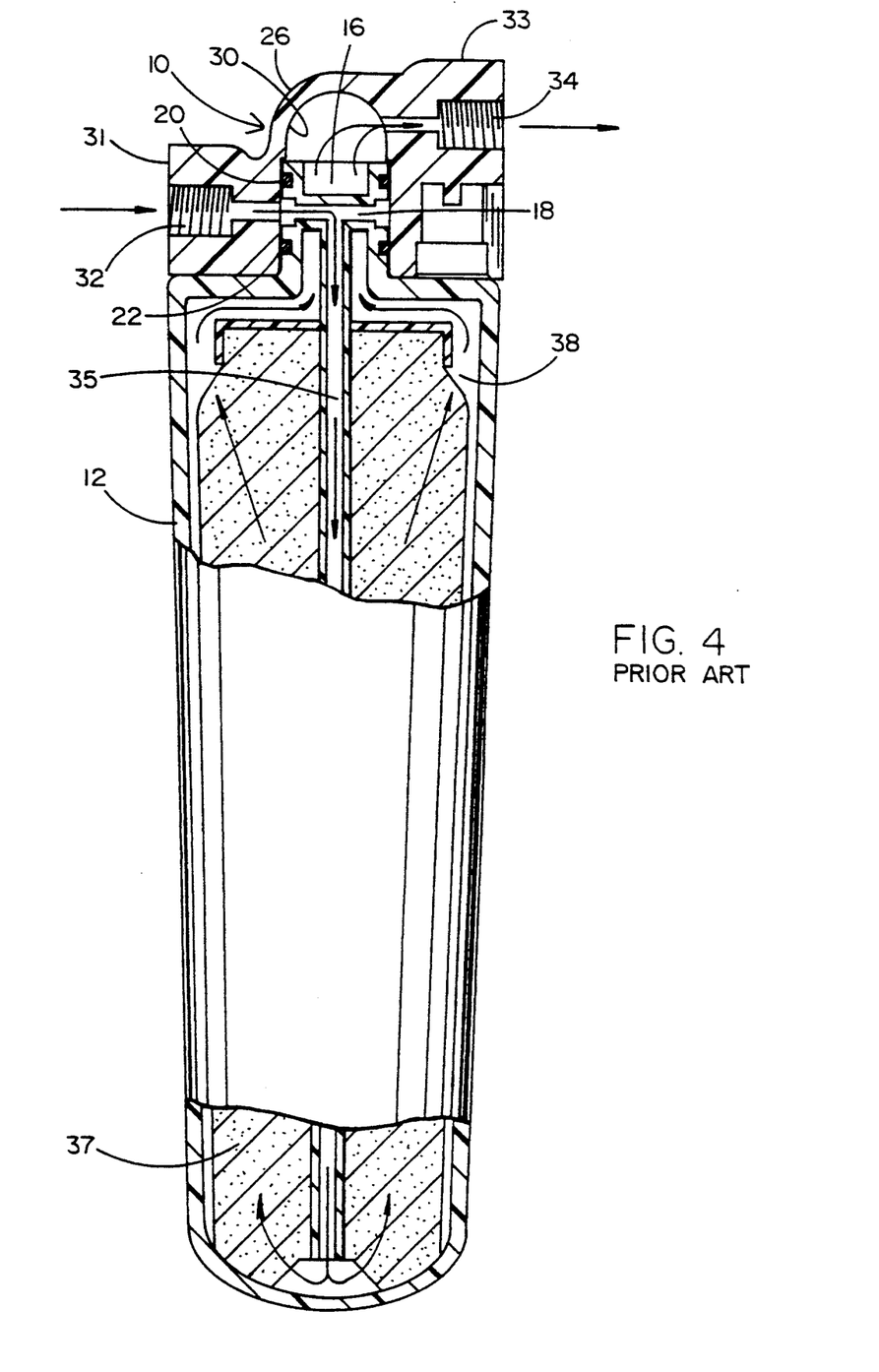
FIG. 4 is a partially cross-sectioned view of the prior art canister and connection device shown in FIG. 1.

The fluid flow relationship between prior art dual-port connection device 10 and canister 12 may be best understood by referring to FIG. 4. As seen in FIG. 4, canister 12 is configured for purposes of illustration herein, as a filtering canister, having an axially positioned input tube 35 which extends virtually the full length of the canister 12 and which is coaxially surrounded by a filtering medium 37. Fluid entering passage 32 of first port 31 is, because of the height of that passage, in fluid communication with the second fluid path 18 which leads to the input tube 35. Accordingly, input fluid enters the connection device through passage 32 and subsequently enters the canister 12 through input tube 35 and travels to the lower-most region of canister 12. The fluid then percolates up through the filtering medium 37 and eventually exits the filtering medium at a position generally adjacent the periphery of the filtering medium, as well as adjacent the top most portion of the canister 12 at an output channel 38. Output channel 38 is in fluid communication with first fluid path 16 from which it may enter the interior of the port connection dome 26 and exit the connection device through passage 34 in second port 33. As seen in FIG. 4, first "O"-ring 20 prevents any fluid mixing between the fluid exiting at first fluid path 16 and the fluid entering at second fluid path 18. Similarly, second "O"-ring 22 prevents any leakage of fluid between the connection device 10 and the canister 12.

The previously noted deficiencies of the prior art connection device 10 may be now better understood as a result of the description of fluid flow through the connection device and the canister 12. More specifically, it will be now understood that because of the relative positions in height of passages 32 and 34, passage 32 can be in fluid communication only with second fluid path 18 and passage 34 can be in fluid communication only with first fluid path 16. Furthermore, because of the relative positions of passages 32 and 34, the direction of fluid through connection device 10 for the input fluid must be the same as the direction for the output fluid. The axes of passages 32 and 34, aside from being at different levels, are unidirectional, and any change of direction for either input fluid flow or output fluid flow would, of course, require the use of an elbow which must be added to the connection device 10. Furthermore, if the connection device 10 and canister 12 were to be interconnected to a second such combination of a connection device and canister, where for example, two filters of the type shown in FIG. 4 were connected together to increase the filtering effect of the combination thereof, it would be necessary to provide a flexible, tubular interface between the output passage of one such combination and the input passage of the other. Alternatively, one could provide a rigid member having an elbow configuration at the output of one such combination of connection device and canister and an elbow connected to the input port of the second such connection device and canister combination. Furthermore, it will be seen that there is no provision in the mechanical configuration of the connection device 10 of the prior art for adding or using additional ports, such as where it is desirable to have either more than one input port or more than one output port. Finally, it will be seen that the threaded recesses 28, seen best in FIG. 1, are positioned below the upper surfaces of port connection dome 26 and ports 31 and 33 and thus are not easily connectable to an exterior bracket or other such structural device without accommodating the potential interference with the overlying structure of the connection device 10.

It will be seen hereinafter that all of these deficiencies of the prior art two-port connection device 10 are overcome in the present invention. More specifically, referring now to FIGS. 5 to 11, it will be seen that the multi-port connection device 40 of the present invention is also configured to mate with the unitary multiple-fluid-path port 14 of the canister 12. More specifically, the multi-port connection device 40 of the present invention provides a similar dome interior 41, designed to mate with port 14 in substantially the same manner as prior art connection device 10. However, unlike the prior art device, the connection device 40 provides at least three ports comprising first port 42, second port 44 and third port 46. Each such port is provided with a passage. More specifically, first port 42 is provided with a passage 43, second port 44 is provided with a passage 45 and third port 46 is provided with a passage 47. It will be noted that all of the ports of the connection device 40 of the present invention have axes which are co-planar, that is, all such ports are at precisely the same level in a plane that is perpendicular to the axis of canister 12.

Figure 5:
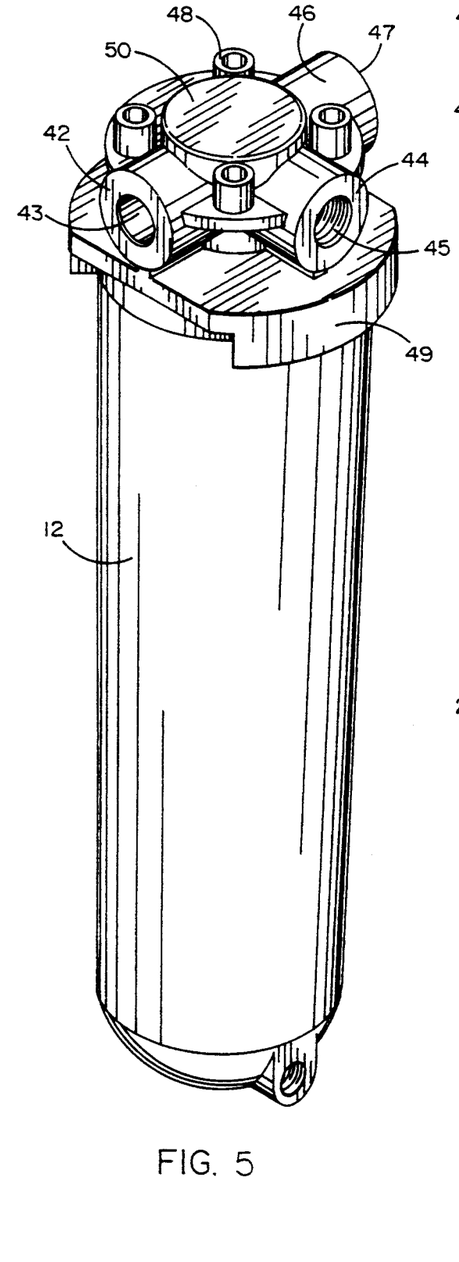
FIG. 5 is an isometric view of the prior art canister, similar to that of FIG. 1, but showing the multi-port connection device of the present invention thereon.
Figure 6:
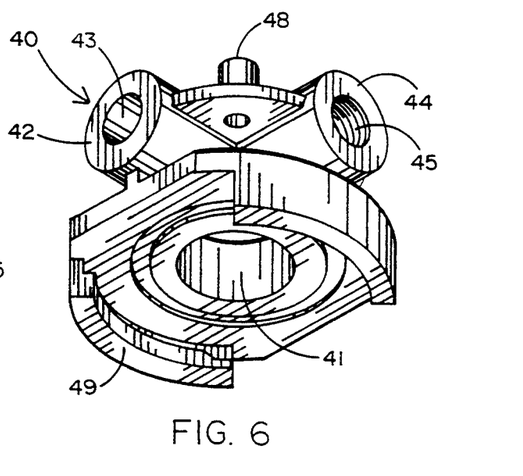
FIG. 6 is an isometric view of the connection device of the present invention.

As seen best in FIGS. 5 and 6, like the prior art connection device 10, connection device 40 of the present invention is provided with a pair of locking members 49, designed to engage the flanges 24 of canister 12. However, unlike the prior art connection device 10, connection device 40 is provided with a plurality of threaded recesses 48, the upper ends of which extend slightly above all of the port structure, as well as above the port connection dome 50, which in the present invention is of a flat configuration in the embodiment shown in FIGS. 5 and 6.

Figure 7:
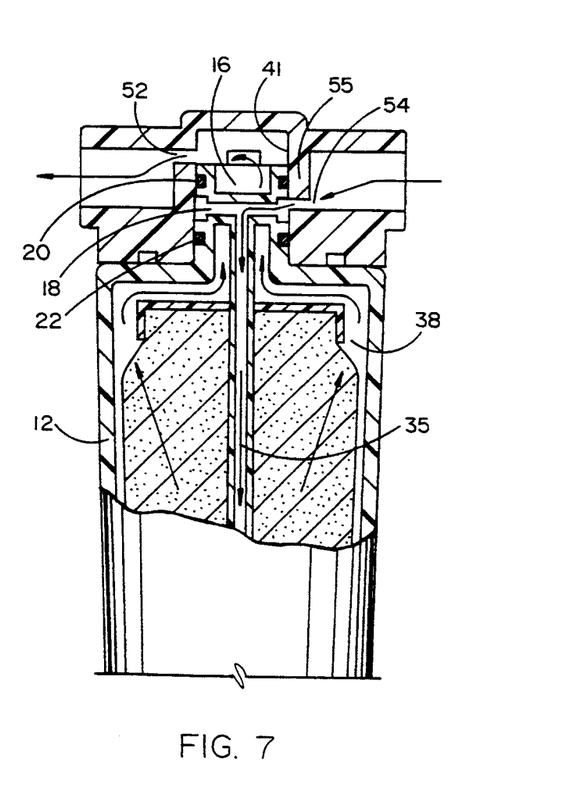
FIG. 7 is a partially cross-sectioned view of the canister of the prior art shown with the connection device of the present invention attached thereto.
Figure 8:
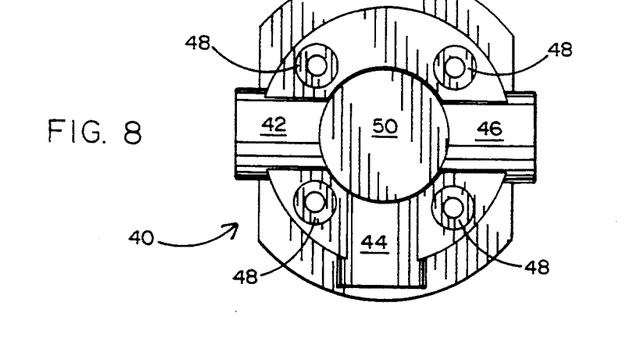
FIG. 8 is a top view of the present invention.
Figure 9:
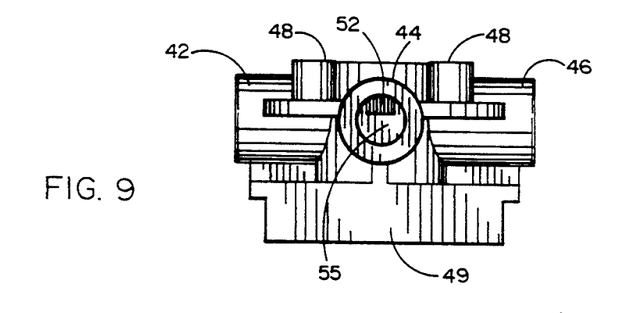
FIG. 9 is a front view of the present invention.
Figure 10:
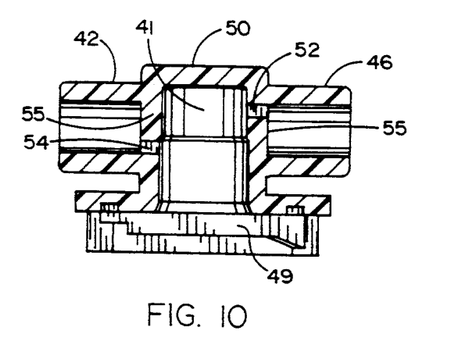
FIG. 10 is a cross-sectional front view of the present invention.
Figure 11:
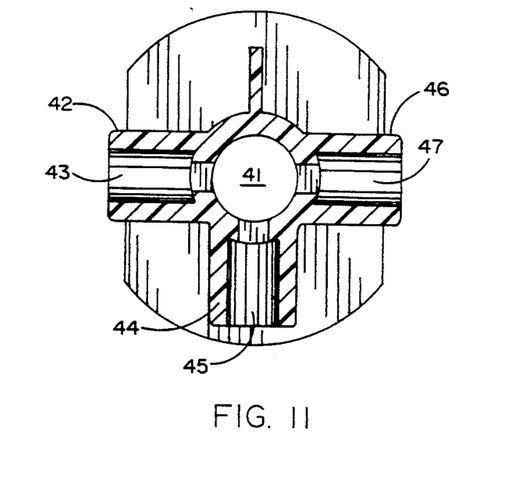
FIG. 11 is a top cross-sectional view of the present invention.

As seen best in FIGS. 7, 9 and 10, the fluid paths between the connection device 40 of the present invention and the filtering canister 12 of the prior art, are nominally interrupted by a barrier 55, positioned in each of the respective ports 42, 44 and 46 between the ports and the interior 41 of port connection dome 50. However, each such barrier 55 may be selectively breeched by an aperture, such as aperture 52 and 54, respectively, the position of such apertures determining whether the port passage is in fluid communication with first fluid path 16 or with second fluid path 18. More specifically, as seen best in FIGS. 7 and 10, aperture 52 through barrier 55 of port 46 is positioned above "O"-ring 20 while aperture 54 through barrier 55 or port 42 is positioned below "O"-ring 20. Consequently, aperture 52 provides a fluid flow path which is in communication with first fluid path 16 while aperture 54 provides a fluid path which is in communication with second fluid path 18 of port 14 of canister 12. Of course, it will be understood that in the event no aperture is provided through a barrier 55, there is no fluid passage between the corresponding port and the fluid flow paths of canister 12.

Thus it will be seen that in the present invention, the user may designate any port as a fluid flow port, simply by drilling or otherwise creating an aperture through the barrier 55 for that port. Furthermore, it will be seen that whether that port is in fluid communication with either the first fluid path or the second fluid path of port 14 of the canister 12, is a function of whether the position of the aperture through barrier 55 is above or below "O"-ring 20 when the connection device 40 is affixed to the canister 12. Thus, unlike the prior art connection device 10, previously described in conjunction with FIGS. 1 through 4, the connection device 40 of the present invention provides a highly advantageous port selection feature. The selection process comprises deciding whether or not to drill or otherwise provide an aperture through the corresponding barrier 55 and where to place the aperture; above the position of "O"-ring 20 or below the position of "O"-ring 20. Thus, in the present invention any port or ports may be designated and functionally designed to operate as an input port. Similarly, any port or ports may be designated and designed to function as an output port. If only two ports are desired, one for input and one for output, one merely refrains from drilling or otherwise providing an aperture through the barrier 55 of the third port.

The direction of flow between the two ports selected to have apertures through their corresponding barriers 55 can be either direction, depending upon which port is to have an aperture above "O"-ring 20 and which port is to have an aperture below "O"-ring 20. Thus for example, in considering the view in FIG. 8, it will be seen that if one chooses to have port 42 as the input port to canister 12 and port 44 as the output port, one merely drills or otherwise provides an aperture through the barrier 55 of port 42 below "O"-ring 20 and similarly, one merely provides an aperture through the barrier of port 44 above "O"-ring 20. In this fashion, fluid flow through the connection device 40 is in through port 42 and out through port 44. If port 46 is designated to not provide a passage in a particular application, then barrier 55 corresponding to port 46 is merely left intact without an aperture therethrough.

It will be understood that by reversing the level of the apertures through the barrier 55 at ports 42 and 44, the direction of fluid flow therethrough may be reversed. Similarly, it will be understood that if it is not desirable to have a 90 degree turn in the direction of fluid flow from port 42 to port 44, one may merely select port 46 as that which has an aperture through its barrier and not provide an aperture through the barrier of port 44. Thus, in the present invention, any port may be selected for any direction of fluid flow and any port may be selected to have no fluid flow therethrough. In this fashion, the most significant disadvantages of the prior art connection device 10, previously described, are obviated in the present invention.

Another significant disadvantage of the prior art, namely the relative inconvenience of connecting an input port of one connection device 10 of the prior art to an output device of another connection device 10 of the prior art, is obviated in the present invention. More specifically, because all of the ports of the connection device 40 of the present invention have axes in a common plane, such interconnections may be accomplished by simple straight interconnect members such as those shown for example in FIGS. 12 through 17. Of course, one may also choose to use interconnect members having elbow or other such bent configurations.

Figure 12:
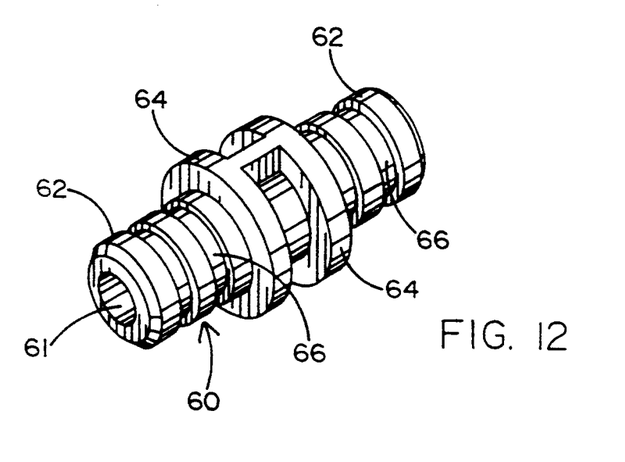
FIG. 12 is an isometric view of a long interconnect member of the present invention.
Figure 13:
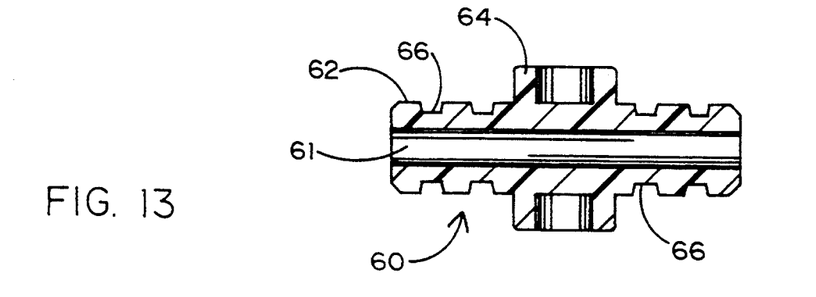
FIG. 13 is a cross-sectional view of the long interconnect member of the present invention.
Figure 14:
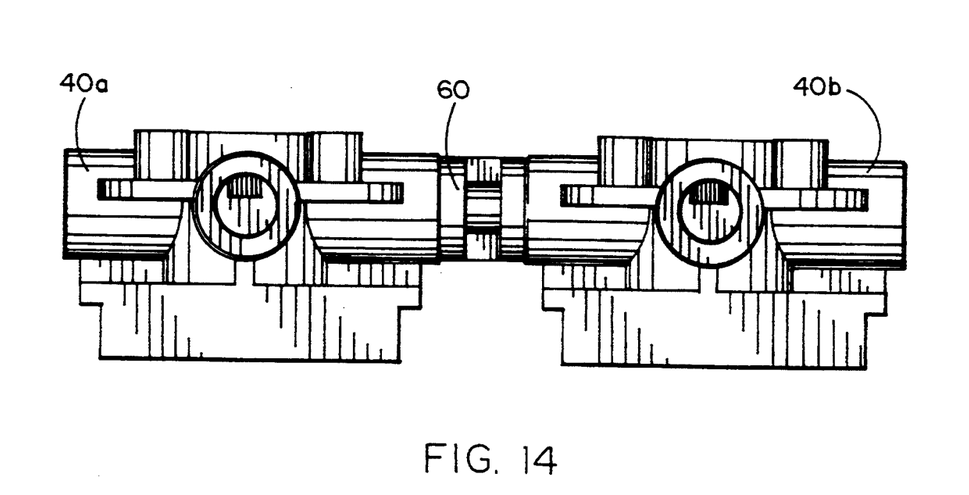
FIG. 14 is an elevational view showing two connection devices of the present invention, interconnected by a long interconnect member thereof.

As seen in FIGS. 12 and 13, one such interconnect member, namely, long interconnect member 16, provides a straight through passage 61 formed by an elongated cylindrical tube 62 and a pair of spaced apart walls 64. In a preferred embodiment of the long interconnect member 60, each end of tube 62 extending from a corresponding wall 64 is provided with a plurality of "O"-ring ridges 66 which assure a firm, watertight fit in the passage of a port of connection member 40 while still making it convenient to insert and remove the interconnect member 60 from such passage. FIG. 14 illustrates two connection devices 40(a) and 40(b) of the present invention having two ports interconnected by a long interconnect member 60, whereby walls 64 function to provide a selected spacing between the ends of the passages of the respective connection devices 40(a) and 40(b).

Figure 15:
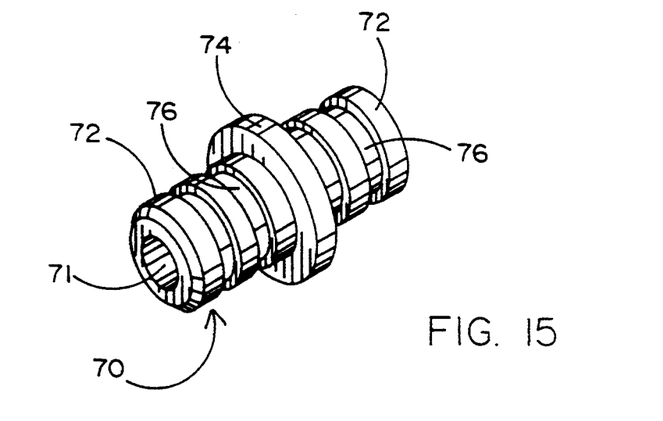
FIG. 15 is an isometric view of a short interconnect member of the present member of the present invention.
Figure 16:
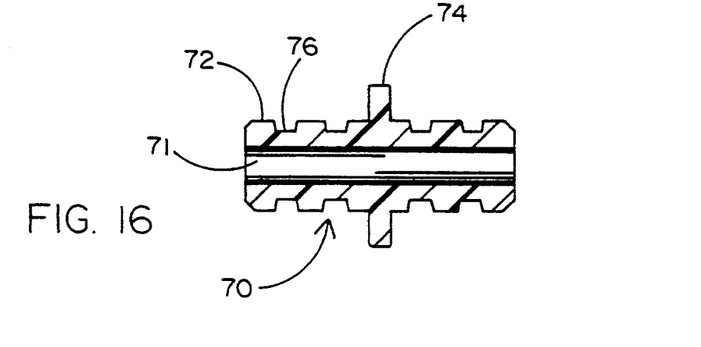
FIG. 16 is a cross-sectional view of the short interconnect member of the present invention.
Figure 17:
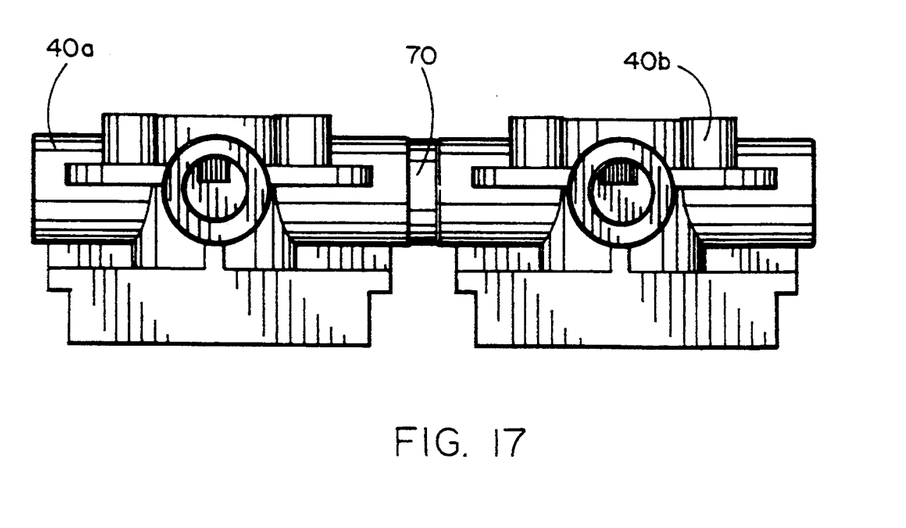
FIG. 17 is an elevational view showing two connection devices of the present invention, interconnected by a short interconnect member thereof.

A similar interconnect member, namely, short interconnect member 70 is shown in FIG. 15. Interconnect member 70 also provides a passage 71 and comprises a tube 72, the center of which is provided with a unitary wall 74. The exterior of the tube on either side of wall 74 also being provided with ridges 76, similar to ridges 66 of long interconnect member 60. The short interconnect member 70 of FIGS. 15 and 16 may be advantageously used for interconnecting a plurality of connection devices such as connection devices 40(a) and 40(b) in the manner shown in FIG. 17.

Figure 18:
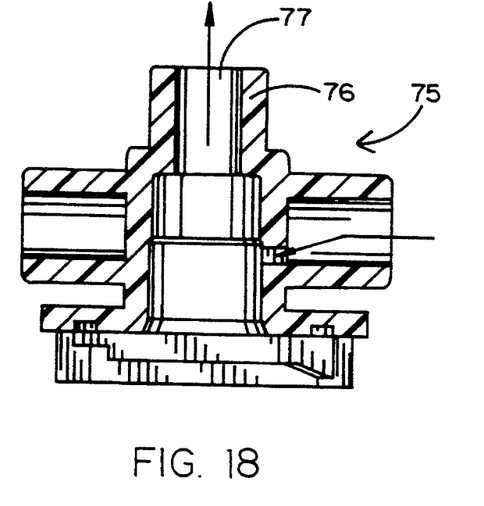
FIG. 18 is a cross-sectional view of an alternative embodiment of the present invention.

Reference will now be made to FIG. 18, which provides a cross-sectional view of an alternative embodiment 75 of the present invention. This alternative embodiment provides, in addition to the co-planar ports of the embodiment shown in FIGS. 5 through 11, an additional port which extends perpendicularly from the plane of the ports of the earlier embodiment. More specifically, as shown in FIG. 18, a perpendicular (or Z-axis) Z-port 76 is provided through the port connection dome 50 and having a passage 77 therethrough which is in fluid communication with the first fluid path 16 of port 14 of canister 12. Z-port 76 can be optionally used to provide a means for inserting a probe or other sensor device into the connection device 40 of the present invention, such as for sampling the quality of the output fluid of filter canister 12 in a water purification system for assessing the efficacy of the filtering by the canister. Such a probe can be in fluid communication with a shut-off valve located elsewhere in the system and which permits the additional capability of entirely blocking the flow of fluid to or from the canister 12. The flat regular shape of port connection dome 50 of connection device 40 of the present invention, in contrast to the irregular shape of port connection dome 26 of the prior art connection device 10, makes it readily easy to provide such an additional Z-port 76 which may be advantageously used in the manner previously described.

An especially significant advantage of the present invention may now be more fully appreciated. More specifically, it will now be seen that the present invention, with its optional in-line and/or perpendicular port configuration, can be used in a multitude of different flow path shapes. Such shapes include for example, straight-through using one or more connection devices; elbow using one or more connection devices; and a host of additional complex flow path shapes using a combination of the connection devices herein and straight and/or bent interconnects to expedite installations around obstructions or structures that would otherwise require complex prior art plumbing devices to avoid. Thus, the present invention may be viewed as a universal building block fluid flow device useful in a large variety of fluid-directing applications.

It will now be understood that what has been described herein comprises a unique multi-port connection device for interconnection with a canisters of the type having a unitary multiple-fluid-path port. The connection device of the present invention substantially reduces or entirely overcomes a number of noted deficiencies of a prior art connection device. More specifically, in the present invention, a number of ports greater than two may be provided and each may be selectively configured to provide a fluid path, either as an input or output port. In this manner, either straight-through or 90 degree fluid flow direction may be provided and fluid may be made to flow in either direction through any port, depending upon the position of an aperture drilled or otherwise provided in a barrier between the port passage and the interior of the connection device. The position of the aperture relative to an "O"-ring separating a first fluid path from a second fluid path in the prior art multiple-fluid path-port of the interconnecting canister, is determinative of whether the corresponding port is connected as an input or output port. Furthermore, any one such port may be selected for a non-functional configuration by merely leaving the barrier of that port intact and not drilling or otherwise providing an aperture therethrough. All of the ports of the present invention are configured so that the axes of their respective passages lie in a common plane, perpendicular to the axis of the canister to which the connection device of the present invention may be affixed. As a result, interconnection between ports of respective connection devices may be readily accomplished by interconnect members of simple straight-through configuration. Furthermore, the mechanical structure of the present invention is far more conducive than the aforementioned prior art for interconnection to a bracket or other planar structural member because of the provision of threaded recesses above the level of all other otherwise interfering structure. Finally, the present invention provides a highly advantageous second embodiment for an additional Z-port which may be provided perpendicular to the previously mentioned co-planar ports, such as for insertion of a sensor or probe, or as an additional flow passage in a direction perpendicular to the fluid flow through the aforementioned co-planar passages.

Those having skill in the art to which the present invention pertains, will now as a result of the applicants' teaching herein, perceive various modifications and additions which may be made to the invention. By way of example, it will now be seen that a fourth co-planar port may be provided in the present invention to serve as an optional added port which like the others disclosed herein, may be selected as either an input or an output port. Furthermore, while the ports of the present invention are configured to be either parallel or perpendicular to all of the other ports thereof, it will be understood that the angles of respective ports in the present invention may be selected to be different from those shown herein. Thus for example, it would be simple to provide a configuration in accordance with the present invention in which three co-planar ports are at angles of, for example, 120 degrees relative to one another. In general terms, it will be clear now that the precise shape and structural configuration of the present invention may be readily modified or added to, to provide additional capability or configuration suitable for interconnection in a water purification system and the like. Accordingly, all such modifications and additions are deemed to be within the scope of the invention which is to be limited only by the claims appended hereto.

We claim:

1. An improved connection device for interfacing a canister having a unitary multiple-flow-path port and commonly used to house a reverse osmosis membrane or filtering media for filtering a liquid such as water in a water purification system, the unitary dual flow-path port of the canister having an input flow path and an output flow path, access to respective flow-paths being segregated by an "O"-ring seal on the canister port; the connection device comprising:

a cylindrical barrier wall configured for engaging said canister port, respective portions of said barrier wall being positioned on either side of said "O"-ring;

a plurality of flow ports extending radially outward from said barrier wall, said flow ports having respective fluid passages the axes of which are substantially co-planar; and an aperture in said barrier wall in each of said flow ports in which liquid flow is enabled between said connection device and said canister, the position of each such aperture relative to the position of said "O"-ring being determinative of whether a corresponding flow port is in fluid communication with said input flow path or with said output flow path.

2. The improvement recited in claim 1 wherein there are at least three of said flow ports.

3. The improvement recited in claim 2 wherein said flow ports are angularly spaced at ninety degree intervals around said barrier wall.

4. The improvement recited in claim 1 wherein at least two such flow ports are perpendicular to one another.

5. The improvement recited in claim 1 wherein at least two such flow ports are coaxially aligned.

6. The improvement recited in claim 1 further comprising an additional flow port extending coaxially with the axis of said barrier wall and perpendicularly to said co-planar axes of said fluid passages.

7. The improvement recited in claim 1 further comprising a plurality of mechanical attachment recesses axially extending beyond said barrier wall and said flow ports.

8. The improvement recited in claim 1 further comprising an elongated, cylindrical interconnect member having a passage therethrough for interconnecting one of said flow ports of said connection device to a flow port of another such connection device.

9. A connection device for attachment to liquid filter and membrane canisters having a unitary multiple-flow-path male connector, the canister connector having first and second flow channels isolated from one another by an "O"-ring; the improvement comprising:

at least three flow ports the axes of which lie in a common plane;

a female connector connected to said flow ports adjacent the common intersection thereof for contiguous engagement with said canister male connector; and means for establishing fluid communication between at least one of said flow ports and said first flow channel and for establishing fluid communication between at least one of said flow ports and said second flow channel.

10. The connection device recited in claim 9 further comprising an additional flow port positioned perpendicularly to said three flow ports.

11. The connection device recited in claim 9 wherein said means comprises an aperture in said female connector within said at least one of said flow ports, the position of said aperture relative to said "O"-ring determining whether said fluid communication is with said first or said second flow channel.

12. The connection device recited in claim 9 wherein at least one of said flow ports is not in fluid communication with either of said flow channels.

13. The connection device recited in claim 9 wherein at least two of said flow ports are in fluid communication with one of said flow channels.

14. The connection device recited in claim 9 wherein at least one of said flow ports is perpendicular to at least one other of said flow ports.

15. The connection device recited in claim 9 wherein at least one of said flow ports is coaxial with at least one other of said flow ports.

* * * * *